United States Patent
Michel

(10) Patent No.: US 6,688,665 B2
(45) Date of Patent: Feb. 10, 2004

(54) MOTOR VEHICLE FRONT SEAT

(75) Inventor: Serge Michel, Freneuse (FR)

(73) Assignee: Peugeot Citroen Automobiles SA, Neuilly sur Seine (FR)

(*) Notice: Subject to any disclaimer, the term of this patent is extended or adjusted under 35 U.S.C. 154(b) by 0 days.

(21) Appl. No.: 10/181,921

(22) PCT Filed: Oct. 31, 2001

(86) PCT No.: PCT/FR01/03386
§ 371 (c)(1),
(2), (4) Date: Jul. 26, 2002

(87) PCT Pub. No.: WO02/40311
PCT Pub. Date: May 23, 2002

(65) Prior Publication Data
US 2003/0001404 A1 Jan. 2, 2003

(30) Foreign Application Priority Data
Nov. 15, 2000 (FR) .......................................... 00 14730

(51) Int. Cl.⁷ ................................................ B60N 2/02
(52) U.S. Cl. ................................ 296/65.07; 216/65.17; 297/344.25
(58) Field of Search ........................ 296/65.06, 65.07, 296/65.16, 65.17; 297/344.21, 344.25

(56) References Cited

U.S. PATENT DOCUMENTS 3,724,896 A 4/1973 Belk

FOREIGN PATENT DOCUMENTS

| EP | 0 546 896 A1 | 6/1993 |
| EP | 0 626 288 A1 | 11/1994 |
| GB | 293620 | 7/1928 |
| JP | 8-207627 | 8/1996 |

Primary Examiner—Joseph D. Pape
(74) Attorney, Agent, or Firm—Westerman, Hattori, Daniels & Adrian, LLP

(57) ABSTRACT

The invention concerns a seat, in particular for a motor vehicle, comprising a seat back, a cushion, a pivoting handle mounted on one of the lateral sides of the seat back and adapted to cause the seat back to tilt onto the cushion from a raised position, a rotary plate fixed under the cushion, and a pivoting lever affixed to the rotary plate and adapted to cause the cushion to rotate on itself with the seat back in the raised position. According to the invention, the seat comprises means for pivoting the pivoting lever immediately after the handle has pivoted so as to cause the cushion to rotate about the rotation axis of the rotary plate immediately after the back has been tilted on the cushion.

18 Claims, 2 Drawing Sheets

MOTOR VEHICLE FRONT SEAT

Figure 1:
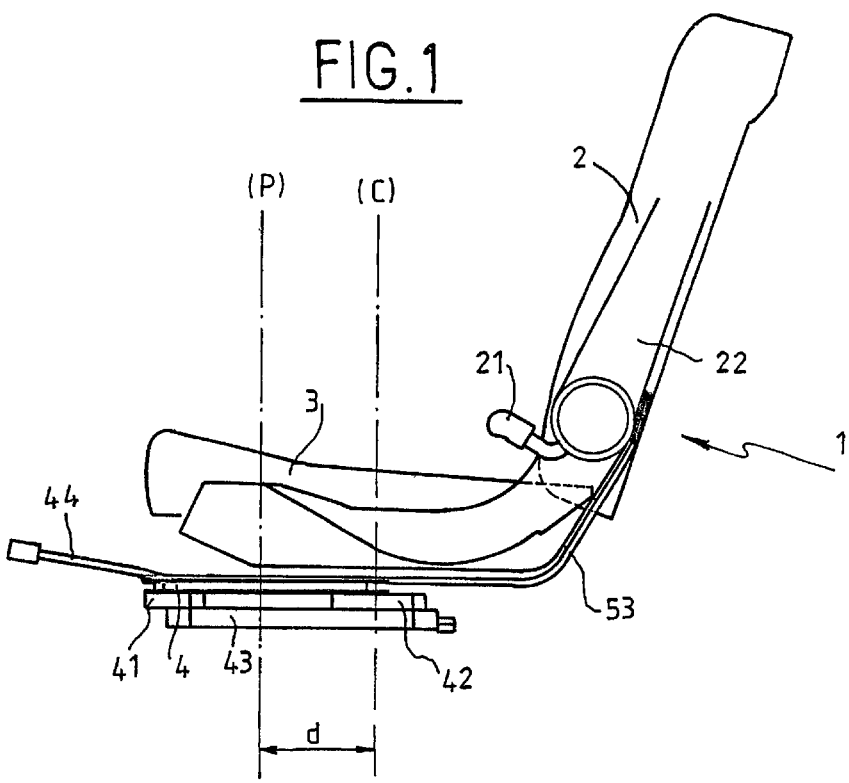

The present invention concerns a seat comprising a seat back, a cushion, a pivoting handle mounted on one of the lateral sides of the seat back and adapted to cause the seat back to tilt onto the cushion from a raised position, a rotary plate fixed under the cushion, and a pivoting lever affixed to the rotary plate and adapted to cause the cushion to rotate on itself with the seat back in the raised position.

It relates more specifically to a seat of this type mounted as a motor vehicle front seat.

BACKGROUND OF THE INVENTION

Usually, the driver or passenger of an automobile experiences more problems in getting into the passenger compartment if it has a limited volume and/or accessibility. Thus, it is not easy for a passenger to reach the rear seats of a "small" vehicle that only has two hinged or sliding doors at the front of the vehicle, and this in spite of the fact that the seat back can be tilted onto the base of the front seat involved.

In some types of vehicles equipped with front seats that rotate on themselves, however, it is possible to improve the accessibility to the rear seats, but at the expense of complicated operations. Indeed, the passenger must turn the handle mounted on the outer lateral side of the seat back with one hand in order to tilt the seat back onto the cushion, and, while bending down, he must simultaneously turn the lever located on the cushion with his other hand in order to rotate the cushion on itself while orienting it towards the outside of the vehicle.

SUMMARY OF THE INVENTION

The purpose of the invention is thus to propose a seat of the type mentioned above which allows the passenger to have a large accessibility to the rear seats of an automobile while being easy to manipulate.

To this effect, an object of the invention is a seat, in particular for an automobile, comprising a seat back, a cushion, a pivoting handle mounted one of the lateral sides of the seat back and adapted to cause the seat back to tilt onto the cushion from a raised position, a rotary plate fixed under the cushion and a pivoting lever fixed to the rotary plate and adapted to cause the cushion to rotate around the axis of rotation of the rotary plate with the seat back in the raised position, characterized in that it comprises means to cause the pivoting lever to rotate immediately after the pivoting of the handle so as to obtain a rotation of the cushion around the axis of rotation of the rotary plate immediately after the seat back has been tilted onto the cushion.

The seat can also comprise one or more of the following characteristics taken alone or in combination:
  the means are comprised of a cable having one of its ends affixed to the rear part of the seat back and the other end affixed to the pivoting lever;
  the cable is housed in a sheath;
  the seat consists of tubes affixed to the lower part of the rotary plate, which extend across it, the ends of these tubes being adapted to be affixed to a floor such as a floor of an automobile;
  the axis of rotation of the rotary plate is offset relative to the axis of the cushion.

The invention also concerns a motor vehicle equipped with at least one seat described above, preferably mounted as a front seat.

SHORT DESCRIPTION OF THE DRAWINGS

Figure 2A:
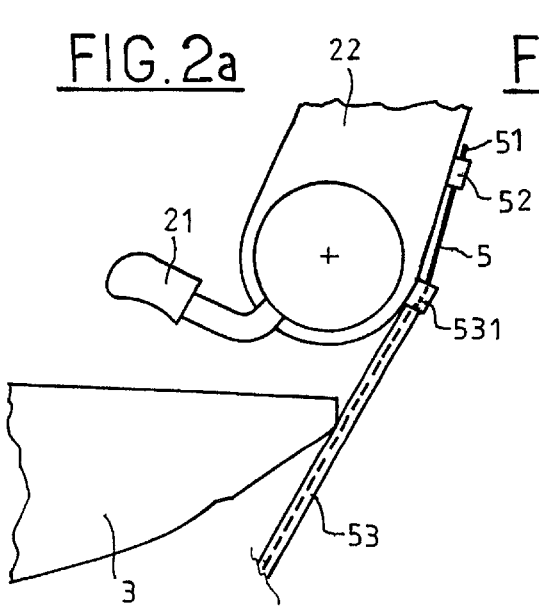
Figure 2B:
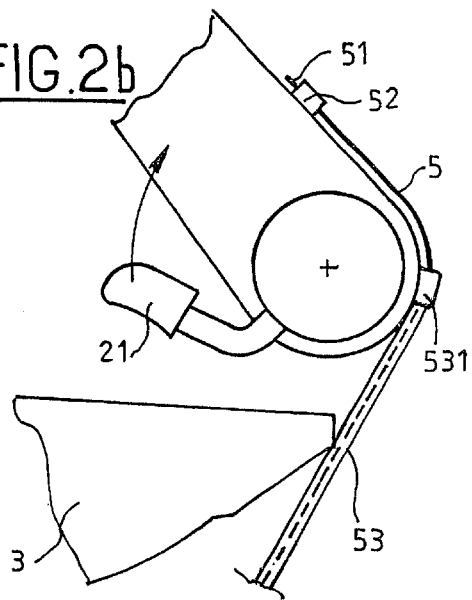
Figure 3:
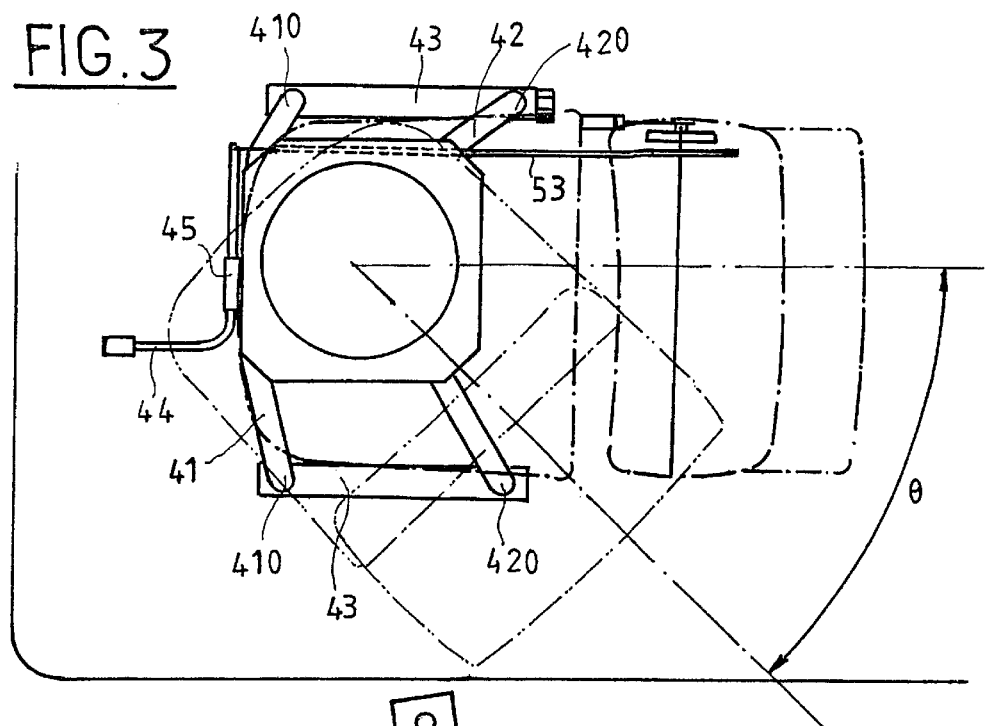
Figure 4:
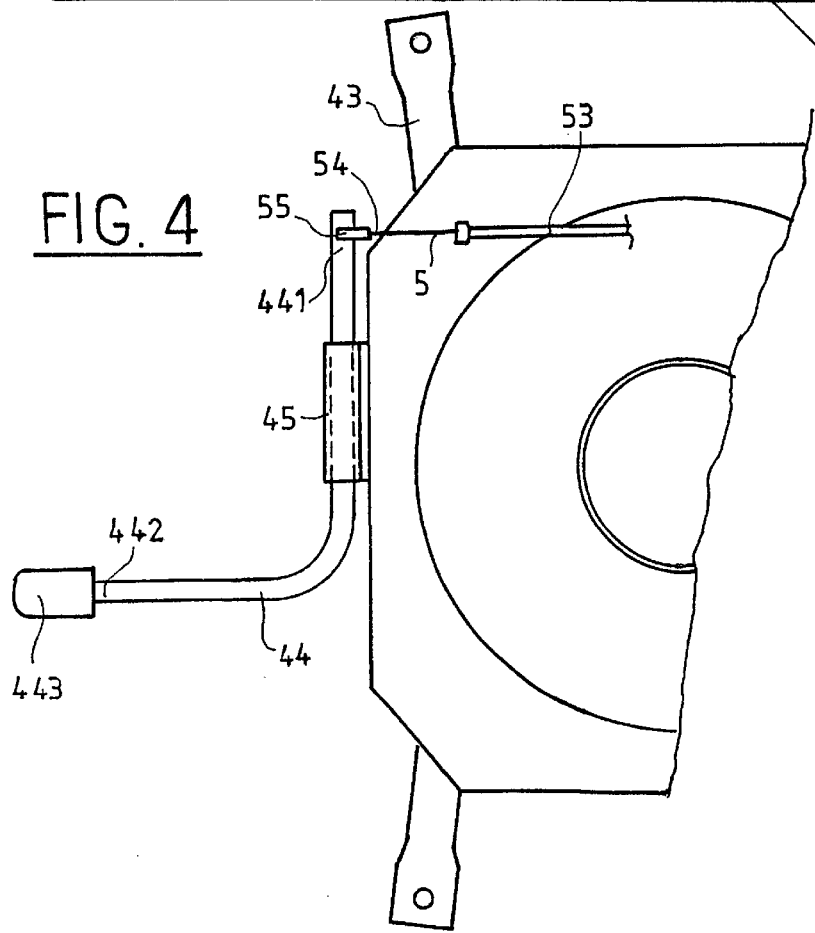

Other advantages and characteristics of the invention will be best understood in reading the detailed description of a particular embodiment made in reference to FIGS. 1 to 4 which show:

FIG. 1: a schematic side view of a front seat of an automobile according to the invention;

FIGS. 2a and 2b: two detailed side views of a part of the seat back according to the invention in a raised position and in an intermediate position of the tilting of the seat back towards the cushion, respectively;

FIG. 3: a detailed top view of the rotary plate according to the invention;

FIG. 4: a top view of the seat according to the invention, the seat back being in an intermediate position tilted on the cushion, the latter having been turned on itself by an angle of 45° relative to the fixed driving position.

DESCRIPTION OF PARTICULAR EMBODIMENTS

FIG. 1 shows a front seat of an automobile wherein access to the rear seats is very limited while the seat back 2 is in a raised position, i.e., approximately vertical to the cushion 3, and when the cushion is in a driving position, i.e., fixed and approximately parallel to the lateral side of the vehicle body, which is not shown.

This front seat 1 comprises, in a manner that is itself known, a handle 21 pivotally mounted on the lateral side 22 of the seat back 2 closest to the front door, which is not shown, when the cushion is in the driving position.

It also comprises a rotary plate 4 affixed below the cushion 3 and having an axis of rotation (P) that is offset from the median axis (C) between the front end and the back end of the seat cushion by a distance d that is sufficiently large to increase the interior living space when the seat back 2 faces the rear seats of the vehicle and that is sufficiently small so that the seat back in the raised position does not come into contact with other elements of the vehicle when the cushion turns, such as the corresponding lateral support of the car body or the dashboard.

As to the rotary plate 4, it comprises, in its lower part, two tubes 41, 42 that are affixed by means of screws, which are not shown, and that extend transversely across the plate along two of its sides. The ends 410, 420 of these tubes are affixed to two side rails 43, also by means of screws, which are not shown. The side rails 43 are themselves affixed directly to the floor of an automobile, also by means of screws.

A pivoting lever 44 is fitted tightly in a flexible, curved tab 45 arranged in front of the rotary plate 4. The rotation of this lever 44 towards the cushion causes, in a manner itself known, a rotation of the cushion 3 around the axis of rotation of the rotary plate (P) with the seat back 2 in the raised position.

Finally, the seat 1 according to the invention comprises a cable 5 having one of its ends 51 fixed in a clamp 52. This attachment of the end 51 of the cable 5 in the clamp 52 can be done by any means available to the person of the art. This can include, for example, a screw going through the clamp that presses the end 51 of the cable 5 against the inside of the recess made in the clamp 52 in which the cable is housed. The clamp 52 is itself affixed to the rear part of the seat back 2 by welding. The cable 5 is arranged in a protective sheath 53 that prevents damage to the cover of the seat 1 and that has a stop 531 against the rear of the seat back 2. The other end 54 is itself fixed into an attachment clamp 55 welded to the pivoting lever 44 at the end 441 opposite the one 442 on which the operating knob of the lever 443 is placed. The entire central part of the cable 5 is itself arranged along the seat 1 below the cushion 3 and along the upper part of the rotary plate 4, the protective sheath 53 being affixed to the rotary plate 4 by means of attachments, which are themselves known, and which are not shown.

The length of the cable 5 is judiciously selected so as not to disturb the complete rotation of the cushion 3 around the axis of rotation of the rotary plate 4, i.e., in the order of 180°. This rotation corresponds to an orientation of the front seat such that the seat back 2 faces the rear seats of the vehicle, with the rear of the seat back facing the dashboard of the vehicle.

Operation of the front seat 1 according to the invention will now be explained.

When a passenger intends to access the rear seats of the vehicle, he operates the handle 21 by causing it to turn around its axis so as to cause the seat back 2 to tilt onto the cushion 3 of the unoccupied front seat 1 and to go from its raised position (FIG. 2a) to an inclined position (FIG. 2b). This tilting of the seat back 2 onto the cushion 3 causes tension in the cable 5 according to the arrow at its end 51 that is integral with the seat back 2. This tension of the cable 5 is sufficient to cause the pivoting of the lever 44 immediately afterwards. The rotation of the cushion around the axis of rotation of the rotary plate 4 is thus obtained immediately after the tilting of the seat back 2 onto the cushion 3.

The passenger can thus, without difficulty, maneuver the seat 1 with the seat back 2 tilted down, and easily orient it towards the outside, for example, at an angle of rotation θ between 45 and 135° (the angle of rotation here is the angle measured from the initial position of the seat 1, i.e., fixed with the rear of the seat back facing the rear seats) as shown in FIG. 3.

Accessibility to the rear seats is thus greatly improved since the passenger can easily orient the front seat 1 when he gets into the vehicle with the seat back 2 tilted down, without having to manipulate other elements.

The embodiment mode which has just been described is very advantageous to the extent that it makes it possible to obtain the desired kinematics while adding a minimum number of parts that do not change the structure of the seat. The additional cost caused by the installation of the cable according to the invention is thus very low.

Of course, different embodiments of a seat of this type, which makes it possible to provide a large accessibility to the rear seats of a vehicle while remaining very easy to manipulate, can be imagined without exceeding the scope of the invention.

Thus, it is possible to imagine a mechanism that allows the rotary plate to slide on rails arranged longitudinally to the vehicle immediately after the seat back has been tilted onto the seat cushion.

What is claimed is:

1. A seat, in particular for an automobile, comprising a seat back, a cushion, a pivoting handle mounted on one of the lateral sides of the seat back and adapted to cause the seat back to tilt onto the cushion from a raised position, a rotary plate fixed under the cushion, a pivoting lever fixed to the rotary plate and adapted to cause the cushion to rotate around an axis of rotation of the rotary plate with the seat back in the raised position, and means for causing the pivoting lever to rotate immediately after the pivoting of the handle so as to obtain a rotation of the cushion around the axis of rotation of the rotary plate immediately after the seat back has been tilted onto the cushion.

2. The seat according to claim 1, wherein the means are comprised of a cable having one of its ends affixed to a rear part of the seat back and the other end affixed to the pivoting lever.

3. The seat according to claim 2, wherein the cable is housed in a sheath.

4. The seat according to claim 1, wherein the rotating plate comprises a rotating part and a stationary part, the seat comprising tubes affixed to a stationary part of the rotary plate, said tubes extending transversely across said stationary part of the rotary plate, said tubes having ends adapted to be affixed to a floor.

5. The seat according to claim 1, wherein the axis of rotation of the rotary plate is offset relative to an axis of the cushion.

6. An automobile equipped with at least one seat according to claim 1.

7. The seat according to claim 2, wherein the rotating plate comprises a rotating part and a stationary part, the seat comprising tubes affixed to a stationary part of the rotary plate, said tubes extending transversely across said stationary part of the rotary plate, said tubes having ends adapted to be affixed to a floor.

8. The seat according to claim 3, wherein the rotating plate comprises a rotating part and a stationary part, the seat comprising tubes affixed to a stationary part of the rotary plate, said tubes extending transversely across said stationary part of the rotary plate, said tubes having ends adapted to be affixed to a floor.

9. The seat according to claim 4, wherein the floor is the floor of a motor vehicle.

10. The seat according to claim 7, wherein the floor is the floor of a motor vehicle.

11. The seat according to claim 8, wherein the floor is the floor of a motor vehicle.

12. The seat according to claim 2, wherein the axis of rotation of the rotary plate is offset relative to an axis of the cushion.

13. The seat according to claim 3, wherein the axis of rotation of the rotary plate is offset relative to an axis of the cushion.

14. The seat according to claim 4, wherein the axis of rotation of the rotary plate is offset relative to an axis of the cushion.

15. An automobile equipped with at least one seat according to claim 2.

16. An automobile equipped with at least one seat according to claim 3.

17. An automobile equipped with at least one seat according to claim 4.

18. An automobile equipped with at least one seat according to claim 5.

* * * * *